United States Patent
Venkatesh et al.

(10) Patent No.: US 7,812,822 B2
(45) Date of Patent: Oct. 12, 2010

(54) OPTO-MECHANICAL POINTING DEVICES THAT TRACK THE MOVEMENT OF ROLLERS POSITIONED AT THE BASE OF THE POINTING DEVICES

(75) Inventors: Shalini Venkatesh, Santa Clara, CA (US); Annette Grot, Cupertino, CA (US); Julie E. Fouquet, Portola Valley, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 909 days.

(21) Appl. No.: 11/607,194

(22) Filed: Nov. 30, 2006

(65) Prior Publication Data
US 2008/0129698 A1 Jun. 5, 2008

(51) Int. Cl.
*G06F 3/033* (2006.01)
(52) U.S. Cl. ............... 345/166; 345/157; 345/163; 345/164; 345/165; 345/167
(58) Field of Classification Search ............... None
See application file for complete search history.

(56) References Cited

U.S. PATENT DOCUMENTS

| | | | | |
|---|---|---|---|---|
| 4,801,931 A | * | 1/1989 | Schmidt | 345/164 |
| 6,081,258 A | * | 6/2000 | Jakubowski | 345/163 |
| 6,476,375 B1 | * | 11/2002 | Nicoud et al. | 250/221 |
| 6,480,185 B1 | * | 11/2002 | Kiljander et al. | 345/167 |
| 7,009,597 B1 | * | 3/2006 | Ames | 345/163 |
| 2007/0002013 A1 | * | 1/2007 | Kong et al. | 345/157 |

FOREIGN PATENT DOCUMENTS

| | | | |
|---|---|---|---|
| JP | 02280220 A | * | 11/1990 |
| JP | 07287639 A | * | 10/1995 |
| JP | 10333824 A | * | 12/1998 |

* cited by examiner

*Primary Examiner*—Sumati Lefkowitz
*Assistant Examiner*—Alonso Tapia

(57) ABSTRACT

Each opto-mechanical pointing device includes a housing having a base that two or more rollers extend beyond to make contact with a surface. An optical module that includes a light source and a detector track the motion of the opto-mechanical pointing device directly or indirectly. Light reflecting off markings positioned opposite of each detector is used to determine the speed and distance traveled by an opto-electrical pointing device. Alternatively, the speed and distance traveled by an opto-electrical pointing device is determined by monitoring the tilt or rotation of the opto-mechanical pointing device with respect to the surface beneath the pointing device.

5 Claims, 4 Drawing Sheets

OPTO-MECHANICAL POINTING DEVICES THAT TRACK THE MOVEMENT OF ROLLERS POSITIONED AT THE BASE OF THE POINTING DEVICES

BACKGROUND

Pointing devices have been used with computers and other types of electronic systems for many years. A computer mouse is one example of a pointing device. With a mechanical mouse, a ball rolls over a surface as the mouse is moved. Interior to the mouse are wheels that contact the ball and convert its rotation into electrical signals representing orthogonal components of motion.

Another type of pointing device is an optical mouse. As an optical mouse moves over a surface, light emitted from a light source within the mouse reflects off the surface and is detected by a motion sensor positioned within the mouse. The motion sensor typically includes a camera that captures images of the surface. The motion sensor analyzes a sequence of images to determine the speed and distance the mouse has moved across the surface.

A basic optical mouse needs particular surface properties in order to accurately determine the motion of the mouse. When a surface is formed from a smooth material such as glass, or includes a reflective material such as a mirror, the absence of surface features in the surface means the motion sensor is unable to acquire the amount of data needed to determine the motion of the mouse.

Alternative optical techniques have been investigated to address this problem. Speckle and other interferometric techniques measure variations in the surface on the scale of the wavelength of light. These small variations create interference patterns that can, in theory, be used to determine motion. Unfortunately, the surface variations in clean, undamaged glass are not sufficient to create strong optical signals, making it difficult for the motion sensor to determine the motion of the optical mouse.

SUMMARY

In accordance with the invention, opto-mechanical pointing devices that track the movement of rollers positioned at the base of the pointing devices are provided. The opto-mechanical pointing devices each include a housing having a base that two or more rollers extend beyond to make contact with a surface. One or more detectors track the motion of the two or more rollers directly or indirectly.

When the motion of the rollers is tracked directly, at least two rollers moving in orthogonal directions with respect to each other include reflective markings or scattering white paint markings. An optical module detects light reflected off the markings of a respective moving roller. Thus, from the perspective of each detector, the light reflected off the respective markings pulses at a rate based on the motion of the corresponding roller. Using this information, a processing device is able to determine the speed and distance traveled for the opto-mechanical pointing device.

When the motion of the rollers is tracked indirectly, each optical module detects light reflected off a respective material that includes reflective markings or scattering white paint markings in one embodiment in accordance with the invention. The material is wrapped around pairs of rollers and the light reflected off the markings pulses at a rate based on the motion of the respective pairs of rollers. Using this information, a processing device is able to determine the speed and distance traveled by the opto-mechanical pointing device.

In another embodiment in accordance with the invention, each detector detects light that is used to monitor the tilt or rotation of the pointing device with respect to the surface beneath the pointing device. As the opto-mechanical pointing device moves over a surface, the angle between the plane of the base of the pointing device and the plane of the surface varies. This variation causes the light reflected off the surface to strike different areas or pixels in one or more detectors. Using the predictably varying light measurements, a processing device is able to determine the speed and distance traveled by the opto-mechanical pointing device.

DETAILED DESCRIPTION

Figure 1:
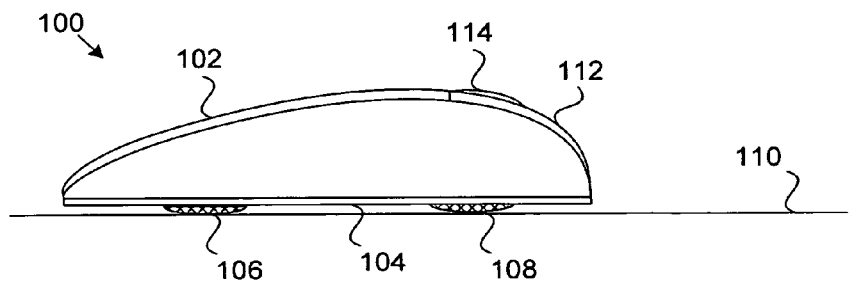
FIG. 1 illustrates a side view of a pointing device in an embodiment in accordance with the invention.

The following description is presented to enable embodiments of the invention to be made and used, and is provided in the context of a patent application and its requirements. Various modifications to the disclosed embodiments will be readily apparent, and the generic principles herein may be applied to other embodiments. Thus, the invention is not intended to be limited to the embodiments shown but is to be accorded the widest scope consistent with the appended claims. Like reference numerals designate corresponding parts throughout the figures.

Referring now to FIG. 1, there is shown a side view of a pointing device in an embodiment in accordance with the invention. Pointing device 100 is shown in a conventional "mouse" shape in the embodiment shown in FIG. 1. Pointing device 100 includes housing 102 and base 104. Rollers 106, 108 roll over surface 110 when a user holds housing 102 with his or her hand and moves pointing device 100 over surface 110. Surface 110 can be a flat surface or a non-flat surface.

Pointing device 100 further includes a clicking region 112 that a user presses with his or her finger to interact with an image or a graphical user interface displayed on a monitor (not shown). Clicking region 112 allows a user to select icons, enter data, move scroll bars or sliders, and interact with or select other features displayed on the monitor. Scroll button 114 allows a user to scroll or move around a document or program displayed on the monitor.

Figure 2:
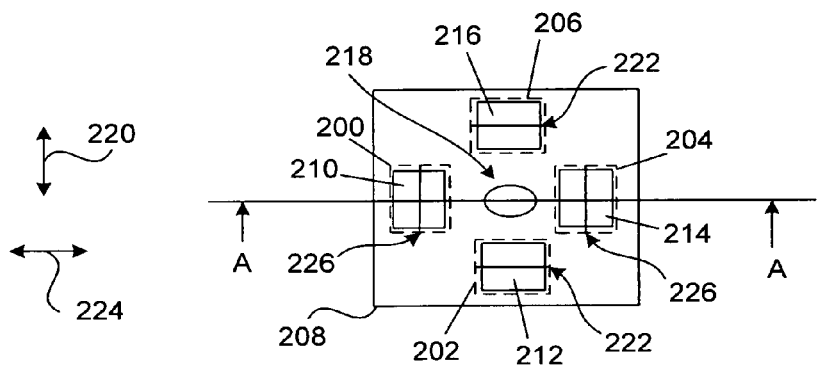
FIG. 2 depicts a bottom view of a first pointing device in an embodiment in accordance with the invention.

FIG. 2 depicts a bottom view of a first pointing device in an embodiment in accordance with the invention. Openings 200, 202, 204, 206 are formed through base 208. Rollers 210, 212, 214, 216 partially extend out of openings 200, 202, 204, 206, respectively, to make contact with a surface (e.g., 110 in FIG. 1). Opening 218 is also formed through base 208 and is configured such that a light source (not shown) located within the housing (not shown) can emit light towards the surface and a detector (not shown) located with the housing can detect the light reflected off the surface.

Rollers 212, 216 roll in the direction indicated by arrow 220 and have an axis of rotation 222 that is perpendicular to the direction of movement. Rollers 210, 214 roll in the direction indicated by arrow 224 and have an axis of rotation 226 that is perpendicular to the direction of movement. The direction of movement for rollers 212, 216 is orthogonal to the direction of movement for rollers 210, 214 in an embodiment in accordance with the invention. Although the embodiment shown in FIG. 2 depicts four rollers, in other embodiments in accordance with the invention two or more rollers may be used, with at least one roller oriented for axis of rotation 222 and one roller oriented for axis of rotation 226.

Figure 3A:
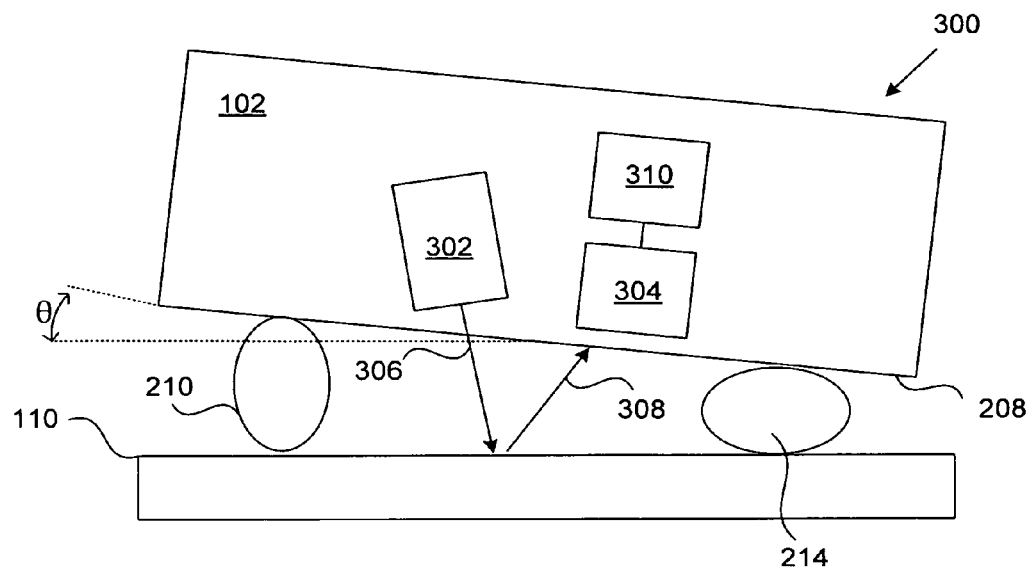
FIGS. 3A-3B illustrate cross-sectional view of a portion of the first pointing device shown in FIG. 2 through line A-A.
Figure 3B:
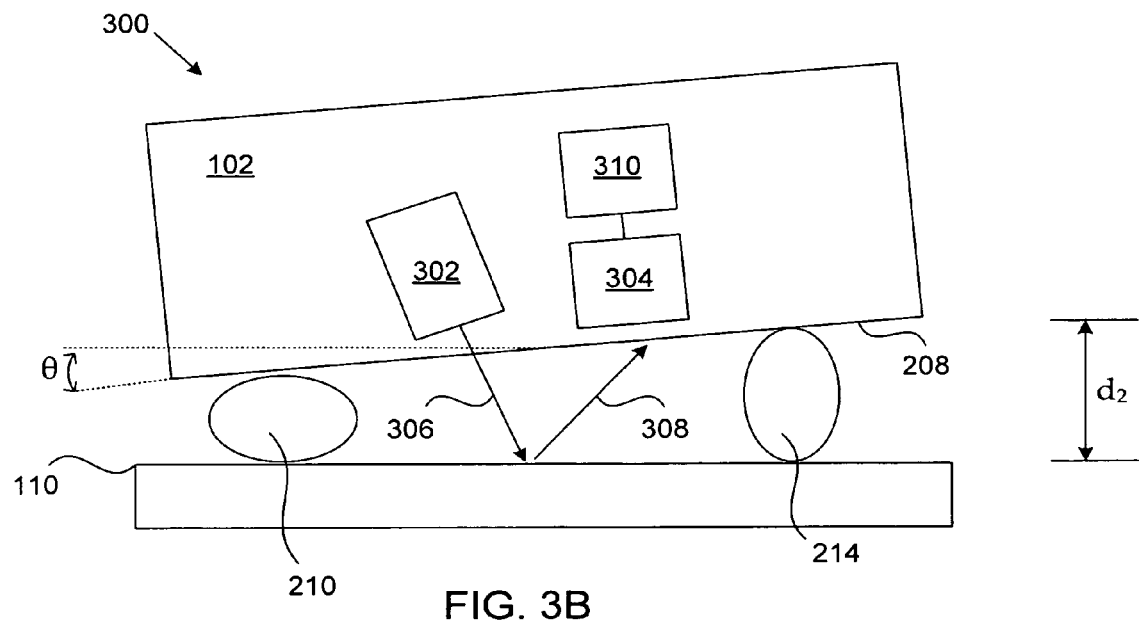

Referring now to FIGS. 3A-3B, there is shown a cross-sectional view of a portion of the first pointing device shown in FIG. 2 through line A-A. Only those components necessary to understand the invention are shown in FIGS. 3A-3B. Roller 212 has been omitted from FIGS. 3A-3B and rollers 210, 214 are shown completely outside of housing 102 for the sake of simplicity.

Pointing device 300 includes light source 302 and detector 304 that combined form an optical module in an embodiment in accordance with the invention. One or more optional lenses or apertures (not shown) may be positioned in the optical path between light source 302 and detector 304. Light source 302 is typically implemented as a light-emitting diode and detector 304 as an imaging detector. In the embodiment shown in FIG. 3, a single light source and a single two dimensional imaging detector are used. Other embodiments in accordance with the invention, however, are not limited to this configuration. For example, a light source and a detector are used with each axis of rotation in another embodiment in accordance with the invention. Light source 302 emits light 306 towards surface 110 located beneath pointing device 300. Light source 302 emits light toward the surface at an oblique angle with respect to the surface in an embodiment in accordance with the invention. Light 308 reflects off surface 110 and is detected by detector 304. Processing device 310 receives signals representing the light measurements from detector 304 and determines the speed and distance at which pointing device 300 is moved over surface 110.

Rollers 210, 214 are asymmetric in shape and are oriented such that roller 210 and roller 214 are positioned differently as pointing device 300 moves over surface 110. In one embodiment in accordance with the invention, roller 210 is locked together with roller 214 so that roller 210 is rolling over one of its ends as roller 214 is rolling over one of its sides, and vice versa. Rollers 210, 214 may be locked together, for example, using a belt or gears. The shape and size of rollers 210, 214 are designed to minimize this "rolling motion" so a user is not aware or significantly aware of the changes in distance between base 208 and surface 110.

The shape and size of rollers 210, 214 are also designed to vary the distance ($d_n$) between an edge of base 208 and surface 110 in a determinable manner. FIG. 3A illustrates the distance between the right edge of base 208 and surface 110 varying as pointing device 300 moves over surface 110. At this point, angle θ between the plane of base 208 and the plane of surface 110 is at a maximum, positive value. The plane of base 208 and the plane of surface 110 are represented in FIG. 3A by the dashed lines.

As pointing device 300 continues to move over surface 110, rollers 210, 214 eventually reach the point where the distance (d) between the right edge of the plane of base 208 and the plane of surface 110 is at its maximum value. The angle θ between the plane of base 208 and the plane of surface 110 is negative.

Because angle θ varies as pointing device 300 moves over surface 110, light 308 strikes different areas or pixels in detector 304. Using the predictably varying light measurements, controller 310 determines the speed and distance at which pointing device 300 moves over surface 110.

Although FIGS. 3A-3B illustrate only two of the four rollers shown in FIG. 2, rollers 212, 216 are also asymmetric in shape in an embodiment in accordance with the invention. In another embodiment in accordance with the invention, only one roller for each axis of rotation is asymmetric in shape. Moreover, the speed and distance at which pointing device 300 is moving over surface 110 can be determined differently in other embodiments in accordance with the invention. By way of example only, a plate is formed over a portion of detector 304 that causes light 308 to be detected only when the value of angle θ is greater than or equal to a given value. The plate blocks light 308 from detector 304 when angle θ is less than the given value. Thus, light 308 appears as a pulsing light when viewed from the perspective of detector 304. The rate of pulsing is then used to determine the speed of pointing device 300 and distance it traveled.

In another embodiment in accordance with the invention, the size and positioning of detector 304 is designed to receive reflected light 308 only when the value of angle θ is less than or equal to a given value. Detector 304 does not detect light or much light when angle θ is greater than the given value. Light 308 appears as a pulsing light when viewed from the perspective of detector 304. The rate of pulsing is then used to determine the speed of pointing device 300 and distance it traveled.

Figure 4:
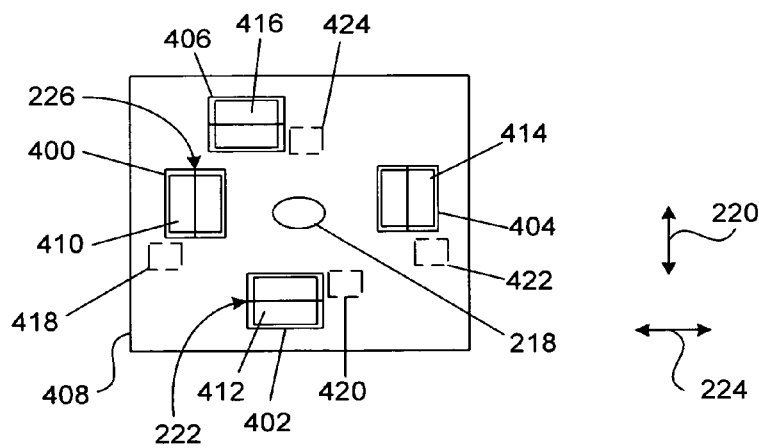
FIG. 4 depicts a bottom view of a second pointing device in an embodiment in accordance with the invention.

FIG. 4 depicts a bottom view of a second pointing device in an embodiment in accordance with the invention. Openings 400, 402, 404, 406 are formed through base 408. Rollers 410, 412, 414, 416 partially extend out of openings 400, 402, 404, 406, respectively, to make contact with a surface (e.g., 110 in FIG. 1). Opening 218 is also formed through base 408 and is configured such that a light source (not shown) can emit light towards a surface and a detector (not shown) can detect the light reflected off the surface.

Rollers 410, 412, 414, 416 are cylindrical-shaped rollers in an embodiment in accordance with the invention. Rollers 412, 416 roll in the direction indicated by arrow 220 and have an axis of rotation 222 that is perpendicular to the direction of movement. Rollers 410, 414 roll in the direction indicated by arrow 224 and have an axis of rotation 226 that is perpendicular to the direction of movement. The direction of movement for rollers 412, 416 is orthogonal to the direction of movement for rollers 410, 414 in an embodiment in accordance with the invention. Although the embodiment shown in FIG. 4 depicts four rollers, in other embodiments in accordance with the invention two or more rollers may be used, with at least one roller oriented for axis of rotation 222 and one roller oriented for axis of rotation 226.

Optical modules 418, 420, 422, 424 are positioned adjacent to rollers 410, 412, 414, 416, respectively. Optical modules 418, 420, 422, 424 are shown with dashed lines in FIG. 4 because optical modules 418, 420, 422, 424 are constructed within the housing (not shown) of a pointing device. Each optical module includes a light source and a rotary encoder or detector in an embodiment in accordance with the invention. Other embodiments in accordance with the invention include one or more lenses in each optical module. An optical module is described in more detail in conjunction with FIG. 6.

Figure 5:
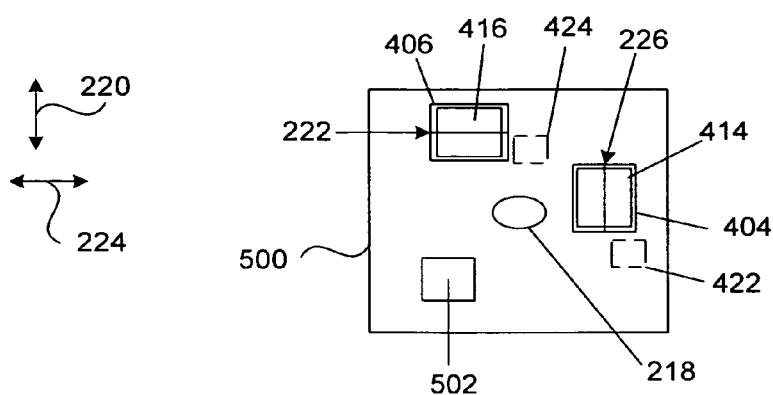
FIG. 5 illustrates a bottom view of a third pointing device in an embodiment in accordance with the invention.

Referring now to FIG. 5, there is shown a bottom view of a third pointing device in an embodiment in accordance with the invention. Openings 404, 406 are formed through base 500. Rollers 414, 416 partially extend out of openings 404, 406 respectively, to make contact with a surface (not shown). Opening 218 is also formed through base 500 and is configured such that a light source (not shown) can emit light towards a surface and a detector (not shown) can detect the light reflected off the surface.

Roller 416 rolls in the direction indicated by arrow 220 with an axis of rotation 222 that is perpendicular to the direction of movement. Roller 414 rolls in the direction indicated by arrow 224 with an axis of rotation 226 that is perpendicular to the direction of movement the direction of movement for roller 416 is orthogonal to the direction of movement for roller 414. Stationary pin 502 is formed as part of base 500 or is affixed to base 500 and is used to stabilize the pointing device as the pointing device rests on or moves over a surface. Although only one stationary pin is shown in FIG. 5, embodiments in accordance with the invention can include any given number of stationary pins configured to allow the two or more rollers to make contact with a surface.

Optical modules 422, 424 are positioned adjacent to rollers 414, 416, respectively. Optical modules 422, 424 are shown with dashed lines in FIG. 5 because optical modules 422, 424 are constructed within the housing (not shown) of a pointing device. Each optical module includes a light source and a detector in an embodiment in accordance with the invention. Other embodiments in accordance with the invention include one or more lenses in each optical module. An optical module is described in more detail in conjunction with FIG. 6.

Figure 6:
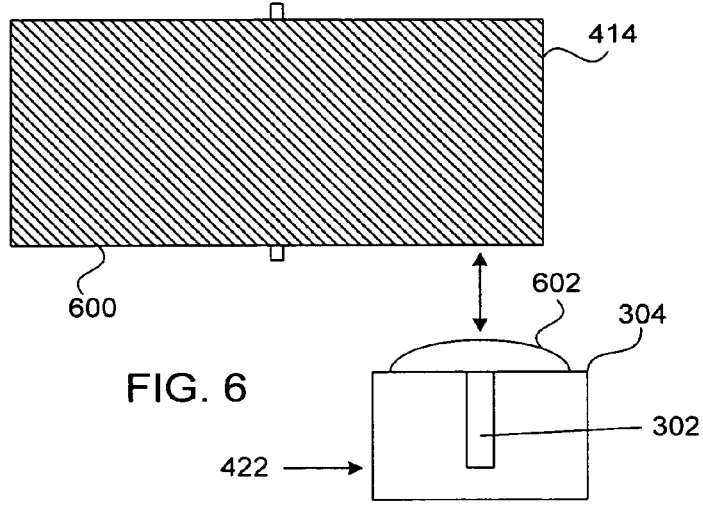
FIG. 6 illustrates optical module 422 and a top view of roller 414 shown in FIGS. 4 and 5.

FIG. 6 illustrates a top view of roller 414 and optical module 422 shown in FIGS. 4 and 5. As discussed earlier, roller 414 is a cylindrical-shaped roller in an embodiment in accordance with the invention. Optical module 422 is positioned opposite of edge 600 of roller 414. Optical module 422 includes light source 302, detector 304, and lens 602 in an embodiment in accordance with the invention. In another embodiment in accordance with the invention, lens 602 is not included in optical module 422. An aperture is substituted for lens 602 in yet another embodiment in accordance with the invention.

Light source 302 emits light towards edge 600 and edge 600 reflects the light. Detector 304 then detects the reflected light. Light source 302 and detector 304 are constructed as one component in an embodiment in accordance with the invention. In another embodiment in accordance with the invention, light source 302 is a separate component and is positioned near detector 304.

Figure 7:
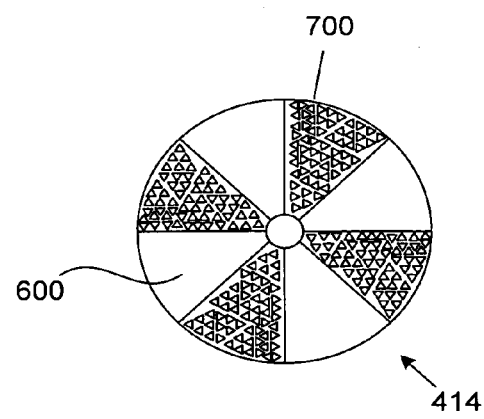
FIG. 7 illustrates a side view of edge 600 of roller 414 shown in FIG. 6.

Referring now to FIG. 7, there is shown edge 600 of roller 414 shown in FIG. 6. Edge 600 includes reflective rotary encoder markings 700 that are positioned opposite optical module 422. The triangle-shaped markings represent a generally retro-reflective marking or a white scattering paint marking for easiest signal processing in an embodiment in accordance with the invention. As roller 414 rolls over a surface, light emitted by light source 302 reflects off reflective rotary encoder markings 700 on the portion of roller 414 located within the housing (not shown). Thus, from the perspective of detector 304, the light reflected off edge 600 pulses at a rate based on the motion of roller 414. Using this information, the speed of roller 414 and the distance it traveled are determined by a processing device (e.g., 310 in FIG. 3).

Figure 8:
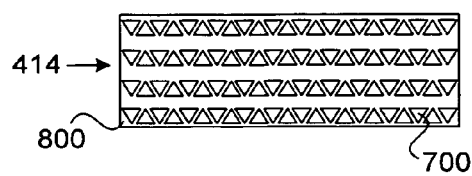
FIG. 8 illustrates a top view of a longitudinal side of roller 414 shown in FIG. 6.

FIG. 8 illustrates a longitudinal side of roller 414 shown in FIG. 6. Longitudinal side 800 includes reflective rotary encoder markings 700 that are positioned opposite an optical module (not shown). As roller 414 rolls over a surface, light emitted by a light source reflects off reflective rotary encoder markings 700. Thus, from the perspective of the detector, the light reflected off edge 600 pulses at a rate based on the motion of roller 414. Using this information, the speed of roller 414 and the distance it traveled are determined by a processing device (e.g., 310 in FIG. 3).

Figure 9:
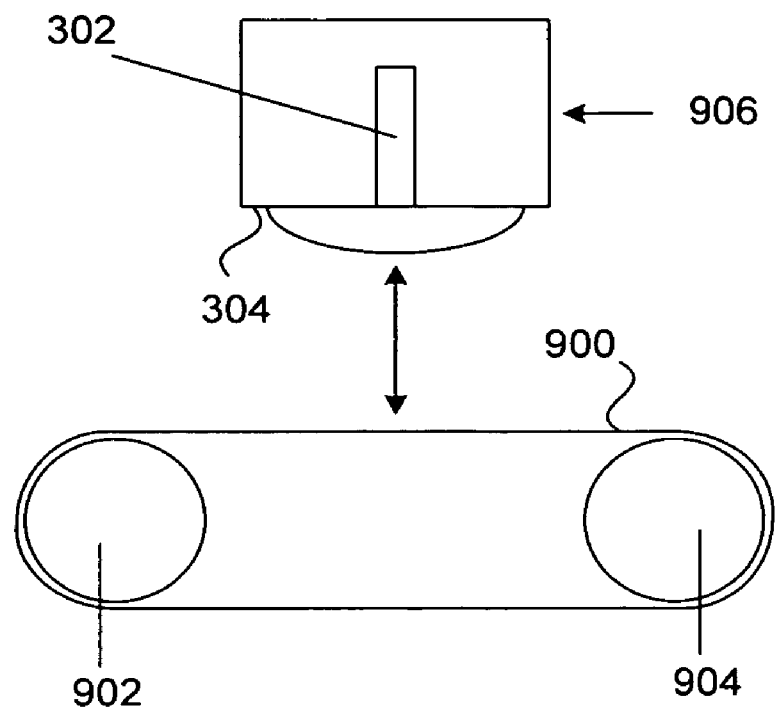
FIG. 9 depicts a side view of a roller-optical component configuration for use in a fifth pointing device in an embodiment in accordance with the invention.
Figure 10:
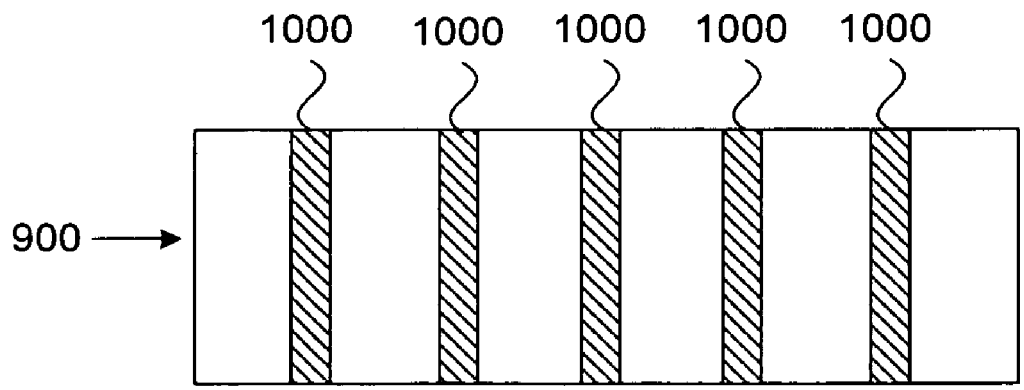
FIG. 10 illustrates a top view of material 800 shown in FIG. 9.

Referring now to FIG. 9, there is shown a side view of a roller-optical component configuration for use in a fifth pointing device in an embodiment in accordance with the invention. A closed-loop of material 900 is wrapped around a pair of rollers 902, 904. FIG. 10 illustrates a top view of material 900 shown in FIG. 9. Reflective rotary encoder markings 1000 are formed on an outer surface of material 900.

An optical module 906 (FIG. 9) is positioned such that light emitted by light source 302 strikes the outer surface of material 900. As rollers 902, 904 roll over a surface, light emitted by light source 302 reflects off reflective rotary encoder markings 1000 and is detected by detector 304. From the perspective of detector 304, the light reflected off material 900 pulses at a rate based on the motion of rollers 902, 904. Using this information, the speed of rollers 902, 904 and the distance they traveled are determined by a processing device (e.g., 310 in FIG. 3).

The invention claimed is:

1. An opto-mechanical pointing device, comprising:
a housing comprising an upper portion and a base;
two rollers partially enclosed within the housing and partially extending beyond the base such that the two rollers are in contact with a surface, wherein one roller is operable to move in a first direction and the other roller is operable to move in a second direction that is orthogonal to the first direction; and
one or more optical modules each comprising a light source operable to emit light and a detector operable to detect an amount of reflected light, wherein the amount of reflected light detected by each detector determines a speed and a distance for at least one roller as the opto-mechanical pointing device moves over the surface,
wherein the two rollers comprise a first roller having a first shape and a second roller having a second shape that is different from the first shape so that an angle between a plane of the base and a plane of the surface varies as the opto-mechanical pointing device is moved over the surface.

2. The opto-mechanical pointing device of claim 1, further comprising a processing device operable to receive signals representing an amount of detected light from each optical module.

3. The opto-mechanical pointing device of claim 1, wherein the light source emits light toward the surface at an oblique angle with respect to the surface and the detector detects light reflected off the surface.

4. The opto-mechanical pointing device of claim 1, further comprising two additional rollers to produce two pairs of rollers, wherein one pair of rollers is operable to move in the first direction and the other pair of rollers is operable to move in the second direction that is orthogonal to the first direction.

5. A method for fabricating an opto-mechanical pointing device comprising a housing and a base, the method comprising:

providing one or more optical modules each comprising a light source and a detector, wherein the one or more optical modules are included in the housing of the opto-mechanical pointing device; and providing two or more rollers that extend at least partially out of the housing and make contact with a surface as the opto-mechanical pointing device moves over the surface, wherein at least one roller moves in a first direction and at least another roller moves in a second direction orthogonal to the first direction and is shaped differently from the at least one roller that moves in the first direction, wherein the two or more rollers comprise a first roller having a first shape and a second roller having a second shape that is different from the first shape so that an angle between a plane of the base and a plane of the surface varies as the opto-mechanical pointing device is moved over the surface.

* * * * *